United States Patent [19]
Palmieri et al.

[11] Patent Number: 5,835,320
[45] Date of Patent: Nov. 10, 1998

[54] DIGITAL CIRCUIT INTERRUPTER THERMAL PROTECTION CIRCUIT

[75] Inventors: Joseph M. Palmieri, Westbrook; George J. Boucher, Plainville; J. Peter McCuin, Bristol; Edward E. Kim, Burlington, all of Conn.

[73] Assignee: General Electric Company, New York, N.Y.

[21] Appl. No.: 864,166

[22] Filed: May 28, 1997

[51] Int. Cl.$^6$ ........................................... H02H 5/04
[52] U.S. Cl. ............................ 361/106; 361/102; 335/43
[58] Field of Search ................................. 361/106, 102, 361/103, 93, 115; 335/23, 43, 44

[56] References Cited

U.S. PATENT DOCUMENTS

| | | | |
|---|---|---|---|
| 4,450,496 | 5/1984 | Doljack et al. | 361/58 |
| 4,672,501 | 6/1987 | Bilac et al. | 361/96 |
| 5,036,303 | 7/1991 | Papallo et al. | 335/17 |
| 5,115,371 | 5/1992 | Tripodi | 361/106 |
| 5,287,077 | 2/1994 | Arnold et al. | 335/8 |

*Primary Examiner*—Jeffrey A. Gaffin
*Assistant Examiner*—Michael J. Sherry
*Attorney, Agent, or Firm*—Richard A. Menelly; Carl B. Horton

[57] ABSTRACT

An electronic circuit interrupter is protected against thermal damage upon loosening of the lug connectors that connect the circuit interrupter with the load circuit. Thermal sensing elements attached to the lugs connect with the circuit interrupter trip unit to initiate circuit interruption when the temperature sensed exceeds a predetermined value.

14 Claims, 2 Drawing Sheets

DIGITAL CIRCUIT INTERRUPTER THERMAL PROTECTION CIRCUIT

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system.

The microprocessor contained within the trip circuit is sensitive to temperatures above ambient that may be sustained for several hours resulting in possible inaccuracy in the microprocessor operation.

U.S. Pat. No. 5,115,371 entitled "Circuit Breaker Comprising an Electronic Trip Device" describes the use of a pair of thermistor units located at separate locations within the circuit breaker enclosure to obtain an average value of the ambient temperature.

There are instances when the ambient temperature in the vicinity of the trip unit remains at a moderate level while the temperature of the connection with the circuit breaker load lugs increases to a near point of combustion of the circuit breaker plastic case and cover material.

Such a condition is caused by the loosening of the load lugs that connect with the protected industrial circuit. The resistance at the point of connection increases to cause a corresponding increase in the power dissipated at the loosened connection. The increased resistance in turn limits the current sensed by the microprocessor so that local temperatures can far exceed the ambient temperature in the vicinity of the microprocessor resulting in eventual combustion, as describe above.

It would be advantageous to continually sense the temperature at the load lug connection with the electrical distribution system that contains industrial equipment and interrupt the circuit current to protect the circuit interrupter in the event the connection becomes loosened.

One purpose of the invention is to provide a simple sensing element in the vicinity of the load lugs to detect any loosening of the load lugs and to cause the trip unit to respond accordingly.

SUMMARY OF THE INVENTION

An electronic circuit interrupter is protected against thermal damage upon loosening of the lug connectors that connect the circuit interrupter with the load circuit. Thermistor elements are attached to the lugs that connect the circuit interrupter trip unit with each phase of an industrial power delivery circuit. A supplemental logic circuit determines the occurrence of a loose lug connection and initiates circuit interruption when the temperature sensed exceeds a predetermined value.

DESCRIPTION OF THE PREFERRED EMBODIMENT

Figure 1:
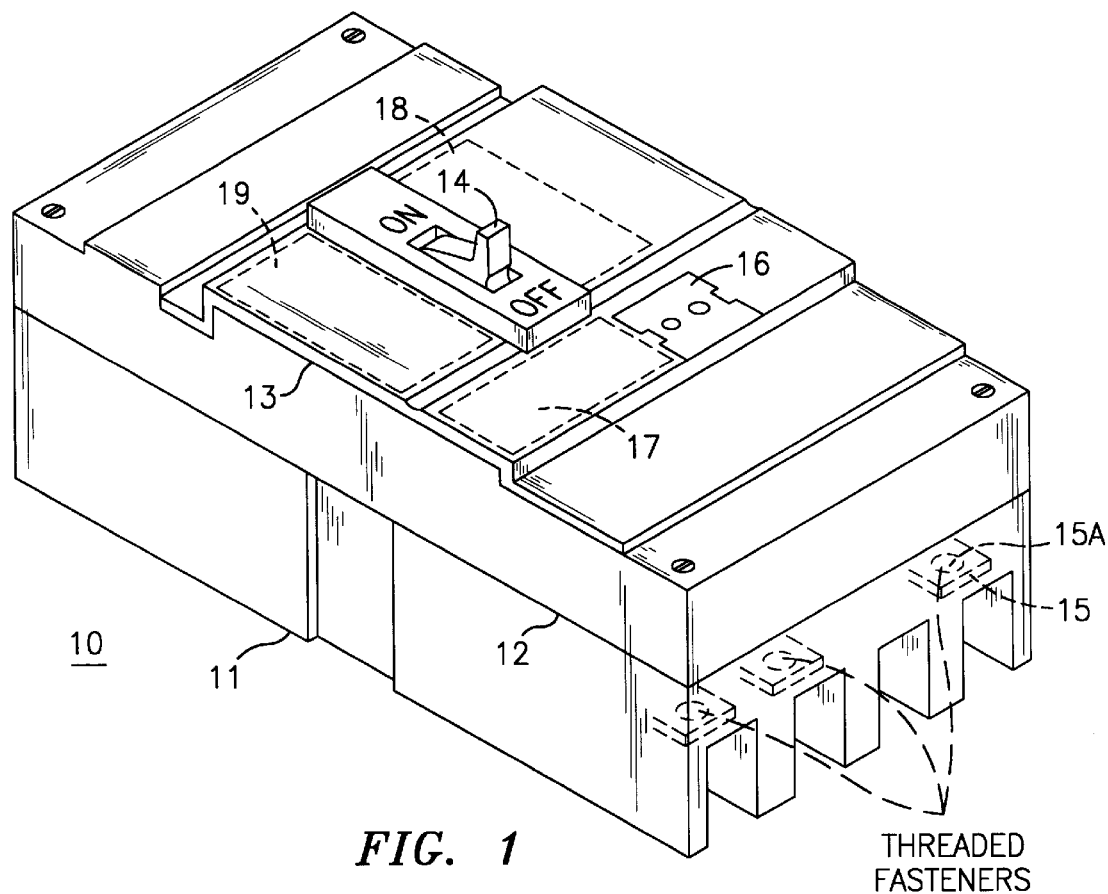
FIG. 1 is a top perspective view of a circuit interrupter that includes the lug protection circuit according to the invention.

A circuit breaker 10, shown in FIG. 1 includes a molded plastic case 11 to which a molded plastic cover 12 containing the circuit breaker operating handle 14 is fixedly attached. As described in U.S. Pat. No. 5,287,077 entitled "Molded Case Circuit Breaker Multipole Crossbar Assembly" the circuit breaker includes an intermediate cover 13 for field installation of selected circuit breaker accessories such as indicated at 18, 19. One such circuit breaker accessory is found within U.S. Pat. No. 5,036,303 entitled "Bell Alarm Accessory Arrangement for Molded Case Circuit Interrupter". The electronic trip unit 17 and rating plug 16 are also enclosed within the circuit breaker cover 12 and are accessed by means of the intermediate cover 13. Three load straps or lugs 15 (terminal means) extend from the load side of the circuit breaker case 11 for connection with the electrical equipment that are connected within the protected electrical distribution circuit. Connection with the electric circuit is made by means of corresponding line lugs (not shown) that extend from the opposite line side of the case 11. In accordance with the invention, thermal sensing elements such as varistors 15A are attached to the load straps 15 and operate in the manner to be discussed below to prevent damage to the circuit breaker in the event the load lug bolt connectors (threaded fasteners) become loose.

Figure 2:
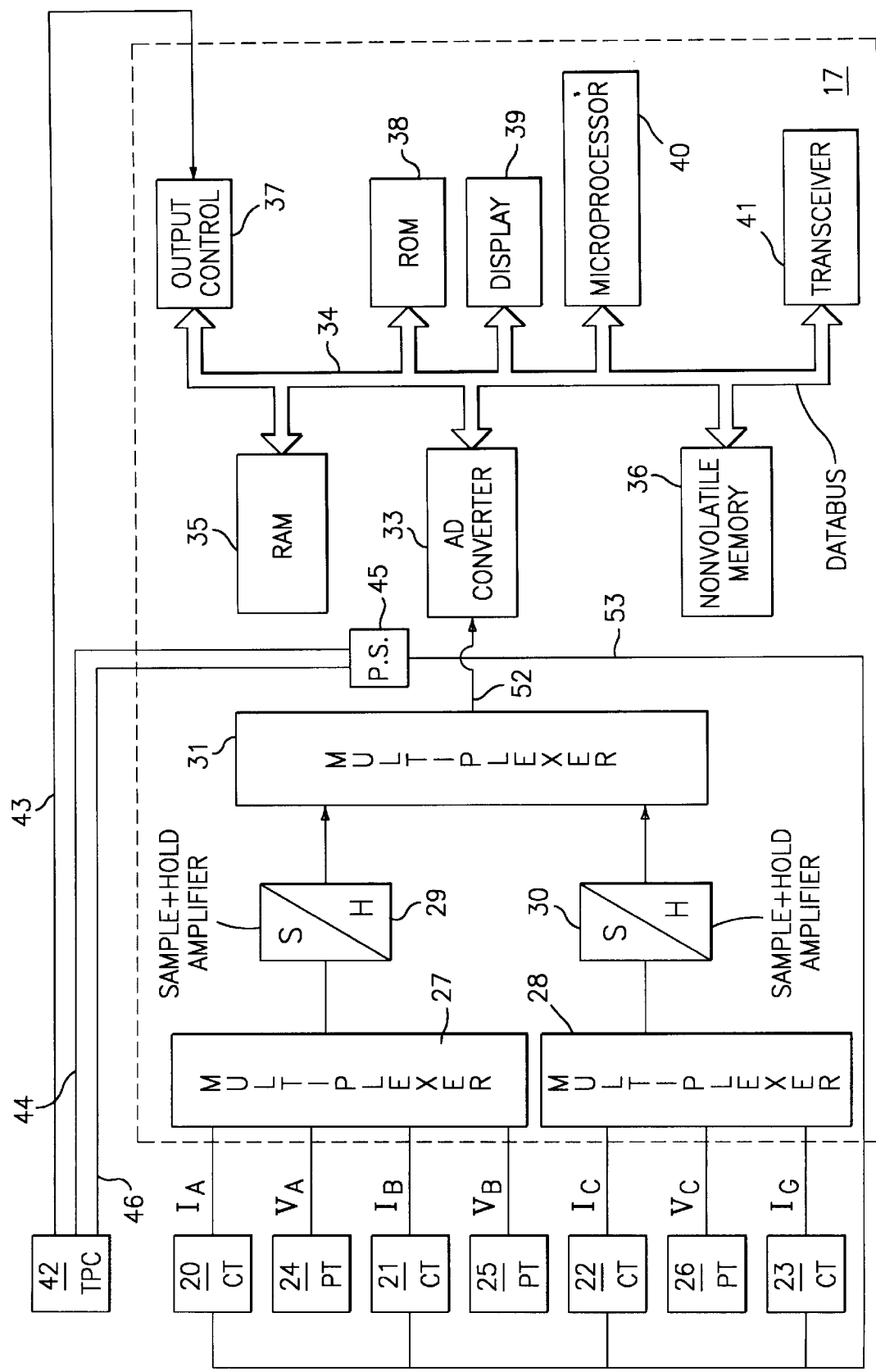
FIG. 2 is schematic representation the electronic trip circuit contained within the circuit interrupter of FIG. 1.

The electric trip circuit 12 contained within the cover 12 of the circuit breaker 10 is shown in FIG. 2 and operates as shown within the aforementioned U.S. Pat. No. 4,672,501. As described therein, the circuit breaker trip unit 17 connects with current transformers 20–23 and potential transformers 24–26. The electrical input is transmitted through multiplexers 27, 28, 31 and sample and hold amplifiers 29, 30 to an A/D converter 33 by means of conductor 52. Circuit protection and control is achieved by utilization of a data bus 34 which is interconnected with an output control 37, transceiver 41, and RAM 35. As described within the aforementioned U.S. Pat. No. 4,672,501 the shunt trip unit contained within the output control circuit operates to articulate the circuit breaker operating mechanism (not shown) to interrupt the circuit current. The ROM 38, microprocessor 40, nonvolatile memory 36 and display 39 operate to insure complete overall circuit protection. Operating power to the trip unit power supply 45 is provided by the current transformers from the associated electrical distribution system over conductor 53 when the associated electrical distribution system is operational. In accordance with the invention thermal protection is provided to the circuit breaker case 11, cover 12 and internal components (not shown) by means of the thermal protection circuit 42 TPC that connects with the output control 37 over conductor 43 and with the power supply 45 over conductors 44 and 46.

Figure 3:
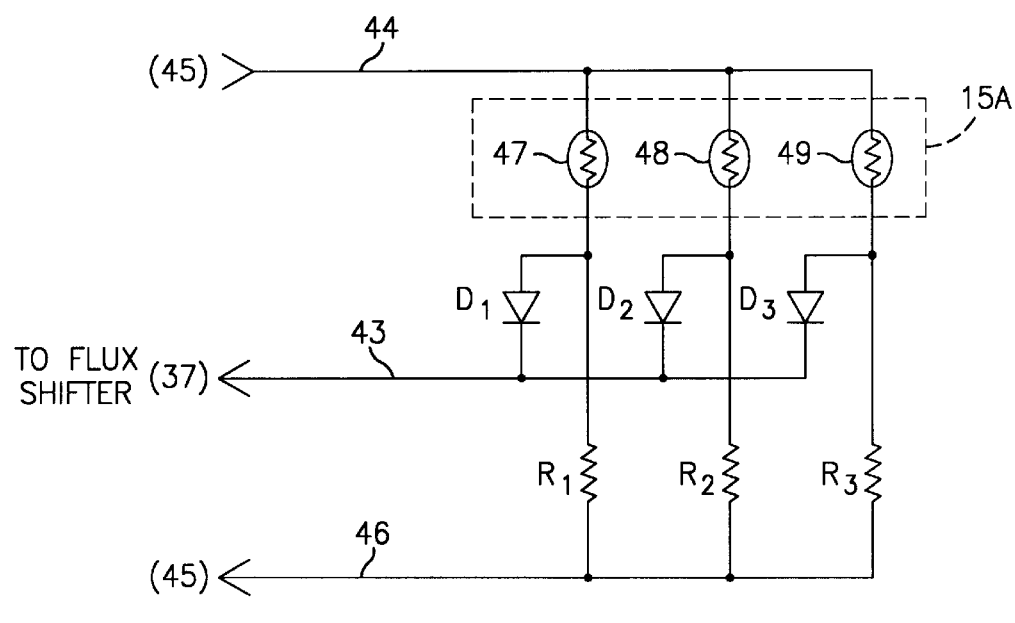
FIG. 3 is an enlarged diagrammatic representation of the components within the thermal logic circuit connecting with the electronic trip circuit of FIG. 1.

The operation of the thermal protection circuit 42 is best seen by now referring to FIG. 3. A reference voltage obtained from the power supply 45 over conductor 44 is provided to the thermistors 15A of FIG. 1 designated 47, 48, 49 for each load strap 15 within each phase of the protected circuit. The voltage is selected to produce a 200 k-ohms resistance at each of the varistors under normal ambient conditions and with the load lugs (not shown) in tight connection with the load straps 15. Load resistors R1, R2, R3 are connected to the outputs of the thermistors 47, 48, 49 respectively to provide a stable output voltage for each phase which is transmitted over conductor 46 to the power supply 45 to complete the circuit. Rectifier diodes D1, D2, D3 (logic circuit) connect with the output control 37 over conductor 43 to provide voltage input to the flux shifter contained within the output control to articulate the circuit breaker operating mechanism to interrupt circuit current in the manner described earlier. The normal operating temperature resistance of 200 ohms seen by the varistors, decreases in proportion to the temperature sensed at the load straps 15 (FIG. 1) due to the negative coefficient of resistance inherent within the thermistors 47, 48, 49. Each thermistor defined in excess of one hundred thousand ohms resistance under quiescent ambient temperature conditions and less than one hundred thousand ohms under over-temperature conditions. The total resistance across the load resistors, R1, R2, R3 is reduced to approximately 15 k-ohms when the varistor temperature is at 85 degrees C. and the resulting voltage is in the order of 1.4 volts. The diodes remain non-conductive until the voltage across the diodes reaches a value of approximately 0.7 volts whereby the diodes become forward biased to transmit sufficient voltage to the required to actuate the flux shifter contained within the output control 37 to interrupt the circuit current.

A thermal protective circuit has herein been described whereby the occurrence of a loose load lug connection is transferred electrically to the circuit breaker flux shifter unit to articulate the circuit breaker operating mechanism to interrupt circuit current before incurring thermal damage to the circuit breaker enclosure and internal components.

We claim:

1. A circuit breaker having lug connection thermal protection comprising:

a circuit breaker enclosure;

an electronic trip unit within said enclosure, said electronic trip unit associated with a circuit breaker operating mechanism to interrupt current through an associated electric circuit upon occurrence of an over-current condition;

load lugs on an exterior of said enclosure arranged for connecting with said associated electric circuit and with said trip unit; and thermal sensing means attached to said load lugs, said thermal means including a thermistor and a diode for providing an electrical signal indicative of thermal conditions relative to said load lugs and causing articulation of said operating mechanism to interrupt current through said associated circuit upon occurrence of an over-temperature condition relative to said load lugs.

2. The circuit breaker of claim 1 wherein said thermistor defines in excess of one hundred thousand ohms resistance under quiescent ambient temperature conditions and less than one hundred thousand ohms under over-temperature conditions.

3. The circuit breaker of claim 1 wherein said load lugs are connected with said electric circuit by means of threaded fasteners.

4. The circuit breaker of claim 1 wherein said diode defines a discrete turn-on voltage.

5. The circuit breaker of claim 4 including a resistor connecting with said diode.

6. The circuit breaker of claim 5 wherein said diode comprises an input and output, said diode providing an output voltage signal when said input receives an input voltage greater than said turn-on voltage.

7. The circuit breaker of claim 6 wherein said turn on voltage corresponds with a predetermined temperature generated at said load lug.

8. The circuit breaker of claim 7 wherein said input to said diode comprises anode and said output from said diode comprises a cathode.

9. The circuit breaker of claim 7 wherein said predetermined temperature is in excess of 80 degrees C.

10. The circuit breaker of claim 9 wherein said thermistor and said resistor are connected with said input to said diode.

11. The circuit breaker of claim 10 wherein said output of said diode connects with a flux shifter unit within said enclosure.

12. An electric trip unit for a circuit breaker comprising:

a microprocessor connecting with a protected circuit for determining occurrence of an over-current condition within said protected circuit and providing a trip signal to a flux shifter to articulate an associated circuit breaker operating mechanism an interrupt current through said protected circuit;

a thermal protection circuit connecting with said flux shifter for providing a trip signal to said flux shifter to articulate said operating mechanism upon occurrence of an over-temperature condition;

a load lug connecting with said protected circuit for providing a current signal to said microprocessor indicative of said over-current condition and thermal sensing means associated with said load lug and connecting with said thermal protection circuit for providing a predetermined voltage signal to said thermal protection circuit in response to an over-temperature condition relative to said load lug.

13. The electric trip unit of claim 12 wherein said thermal sensing means comprises a thermistor.

14. The electric trip unit of claim 13 further including a diode having a discrete turn-on voltage coinciding with said predetermined voltage signal.

* * * * *